United States Patent Office 3,317,446
Patented May 2, 1967

3,317,446
CIS - 1,4 - POLYBUTADIENE-METAL SALT COMPOSITIONS HAVING IMPROVED PROCESSABILITY
Charles R. Wilder, Bartlesville, Okla., assignor to Phillips Petroleum Company, a corporation of Delaware
No Drawing. Filed May 31, 1963, Ser. No. 284,361
4 Claims. (Cl. 260—27)

This invention relates to elastomeric compositions having improved processing characteristics. In one aspect, the invention relates to a method for improving the processability of elastomers. In another aspect, the invention relates to a rubbery composition containing a major amount of an elastomer and a minor amount of a compound which functions as a processing aid and a scorch retarder.

The present invention is concerned with improving the processing characteristics of elastomers, including synthetic rubbers and natural rubber. Until recently the emulsion polymerized copolymer of 1,3-butadiene and styrene (SBR) was recognized as being the most satisfactory synthetic rubber for use in the fabrication of certain articles such as automobile tires. During the last few years, great advances have been made in the preparation of diene polymers, utilizing solution polymerization techniques and so-called stereo-specific catalysts. One of the products that has attracted widespread attention because of its superior properties is a polybutadiene containing a high percentage, e.g., at least 85 percent, of cis 1,4-addition. Another polymer that has achieved considerable importance is a polybutadiene prepared by polymerizing 1,3-butadiene with a lithium based catalyst. It has also been possible to prepare a synthetic cis-polyisoprene by using certain of the catalysts. Because of the outstanding physical properties of these polymers, they are particularly suitable for the fabrication of automobile and truck tires. However, it has been found that the polymers are often difficult to process. It is essential that an elastomer be processable, for otherwise its use is seriously limited.

It is an object of this invention, therefore, to provide an elastomeric composition having improved processing characteristics.

Another object of the invention is to provide a method for improving the processability of elastomers.

A further object of the invention is to provide a method for substantially reducing the tendency of elastomers to precure or scorch.

Other and further objects and advantages of the invention will become apparent to those skilled in the art upon consideration of the accompanying disclosure.

In accordance with the present invention, it has now been discovered that the processability of elastomers can be greatly improved by incorporating in the elastomer a small amount of an additive material selected from the group consisting of naphthenates, resinates and tallates of metals of Groups II and III-B and the fourth period of Group VIII (Mendelyeev's Periodic System). Incorporation of the additive material substantially reduces or eliminates processing difficulties. Mixing or compounding is facilitated, extrusion operations are improved, and scorch time is increased. It was completely unexpected when it was found that the additive material functioned both as a processing aid and as a scorch retarder. In processing operations, it is important that the rubber should not precure or scorch, for otherwise difficulty is encountered in fabricating a satisfactory product.

As stated above, the naphthenates, resinates and tallates of Groups II, III-B and VIII (fourth period) metals can be used as additive materials in the practice of the present invention. These metal salts include those of beryllium, magnesium, calcium, strontium, barium, radium, zinc, cadmium, mercury, aluminum, gallium, indium, thallium, iron, cobalt and nickel. Specific examples of the metal salts are magnesium naphthenate, calcium naphthenate, beryllium resinate, strontium naphthenate, barium resinate, zinc naphthenate, zinc resinate, zinc tallate, cadmium naphthenate, mercury resinate, aluminum naphthenate, gallium tallate, indium resinate, thallium naphthenate, iron resinate, iron tallate, cobalt naphthenate, nickel resinate and the like. These metal salts are well known and can be prepared by procedures described in the literature.

The amount of the additive material used in the practice of the invention is usually in the range of 0.5 to 10.0 parts by weight per 100 parts by weight of rubber. The additive material can be incorporated in the rubber by conventional milling procedures, for example, on a roll mill, in a Banbury mixer, or by the use of similar kneading devices. Temperatures employed during the mixing cycle are generally in the range of 200 to 400° F. The mixing time is that necessary to obtain a homogenous blend and will vary with the size of the batch and the efficiency of the mechanical mixing. However, mixing times in the range of 5 to 20 minutes are usually satisfactory.

In the usual operation, the additive material, i.e., the metal naphthenate, resinate or tallate, is incorporated along with the compounding recipe which conventionally includes one or more fillers, plasticizers, curatives and antioxidants. The total amount of filler used is generally in the range of 25 to 150 parts by weight per 100 parts by weight of rubber. However, it is to be understood that smaller and larger amounts of the filler can be utilized. Examples of suitable fillers include the various silicas, clays, calcium carbonate, calcium silicate, titanium dioxide and carbon black. In preparing compounded stocks to be employed in the fabrication of tires, it is usually preferred to use carbon black. The plasticizers are generally used in amounts ranging from 1.0 to 100 parts by weight of plasticizer per 100 parts by weight of rubber. The amount of plasticizer actually used will depend upon the softening effect desired. Examples of suitable plasticizers include aromatic extract oils, petroleum softeners including asphaltenes, saturated and unsaturated hydrocarbons and nitrogen bases, coal tar products, cumarone-indene resins, and esters such as dibutyl phthalate, and tricresyl phosphate. It is to be understood that mixtures of these plasticizers can be employed. The curatives used in the curing system include a vulcanizing agent, and generally one or more vulcanization accelerators together with one or more accelerator activators. The amount of these materials used in the system generally falls in the following ranges: 0.5 to 5.0 parts by weight of the vulcanizing agent, 0.5 to 3.0 parts by weight of the accelerator, 0.5 to 20.0 parts by weight of the accelerator activator, all ranges being based on 100 parts by weight of rubber. Examples of suitable vulcanizing agents are sulfur, sulfur-liberating agents, such as thiuram disulfide, a thiuram polysulfide, or an alkylphenolsulfide, or a peroxide, such as dicumyl peroxide, or dibenzoyl peroxide. When peroxidic compounds are used as vulcanizing agents, the accelerator and the accelerator activator are frequently unnecessary. Vulcanization accelerators which can be used include dithiocarbamates, thiuram sulfides, and mercaptobenzothiazoles. Examples of specific compounds which are suitable vulcanization accelerators include zinc diethyldithiocarbamate, N,N-dimethyl-S-tert-butylsulfenyldithiocarbamate, tetramethylthiuram disulfide, 2,2'-dibenzothiazyl disulfide, butyraldehydeaniline, mercaptobenzothiazole, N-oxydiethylene-2-benzothiazyl sulfenamide, and N-cyclohexyl-2-benzothiazole sulfenamide. Materials used in the compounding which function as an eccelerator activator include metal oxides such as zinc oxide, magnesium oxide and litharge, which are used in conjunction with acidic materials such as fatty acids, for example, stearic acid, oleic acid, myristic acid, and the like. Rosin acids can also be employed as the acidic material. An antioxidant is usually included in the compounding recipe in an amount ranging, for example, from 0.5 to 3.0 parts by weight per 100 parts by weight of rubber. Examples of suitable antioxidants include phenyl - β - naphthylamine, di-tert-butylhydroquinone, 2,2,4-trimethyl-6-phenyl-1,2-dihydroquinoline, a physical mixture of a complex diarylamine-ketone reaction product and N,N'-diphenyl-p-phenylenediamine, and the like. It is to be understood that it is not intended to limit the invention to any particular compounding recipe, for the invention is broadly applicable to the use of the metal naphthenates, resinates, and tallates to improve the processing characteristics of elastomers regardless of the compounding recipe employed.

In general, the present invention is applicable to the treatment of elastomers, including rubbery synthetic polymers and natural rubber. The invention is particularly applicable to diene polymers prepared by polymerizing a conjugated diene with a catalyst comprising an organometal compound, e.g., a catalyst formed by mixing an organometal and a heavy metal compound, or a lithium based catalyst. These polymers can be defined as being polymers of conjugated dienes containing from 4 to 12, preferably from 4 to 8, carbon atoms per molecule. Examples of monomers that can be used in the preparation of the polymers include 1,3-butadiene, isoprene, piperylene, 2,3-dimethyl-1,3-butadiene, 1,3-octadiene, 4,5-diethyl-1,3-octadiene, and the like. These conjugated dienes can be polymerized to form homopolymers or mixtures of the dienes can be polymerized to form copolymers. Conjugated diene polymers can also be prepared by polymerizing the dienes with one or more copolymerizable mono-vinylidene-containing monomers, such as styrene, 2-methylstyrene, vinylnaphthalene, or the like. Further details on the preparation of rubbery diene polymers with organometal type catalysts are disclosed in U.S. Patent No. 2,979,488.

The present invention is particularly applicable to the treatment of a cis-polybutadiene. The term "cis-polybutadiene" is intended to include a polybutadiene containing at least 85 percent cis 1,4-addition, e.g., from 85 to 98 percent and higher. This type of elastomer can be prepared by polymerizing 1,3-butadiene with a catalyst system that is formed by mixing materials comprising an organometal compound and iodine, present either in the free or combined state. Examples of specific catalyst systems that can be used include those formed by mixing the following components: (1) a trialkylaluminum, such as triisobutylaluminum, and titanium tetraiodide; (2) a trialkylaluminum, such as triethylaluminum, titanium tetrachloride and titanium tetraiodide; and (3) a trialkylaluminum, such as triisobutylaluminum, titanium tetrachloride and iodine. The polymerization process for preparing cis-polybutadiene is generally carried out in the presence of a hydrocarbon diluent, such as an aromatic, paraffinic or cycloparaffinic hydrocarbon. Specific examples of suitable diluents include benzene, toluene, isooctaine, cyclohexane and the like. The amount of the catalyst employed in the polymerization can vary over a rather wide range. The amount of the organometal used in forming the catalyst composition is usually in the range of 0.75 to 20 mols per mol of the halogen-containing component, i.e., a metal halide with or without a second metal halide or elemental iodine. When using a catalyst comprising an organometal compound and more than one metal halide, e.g., titanium tetrachloride and titanium tetraiodide, the mole ratio of the tetrachloride to the iodide is usually in the range of 0.05:1 to 5:1. With a catalyst system formed from an organometal compound, titanium tetrachloride and iodine, the mol ratio of the tetrachloride to iodine is generally in the range of 10:1 to 0.25:1. The concentration of the total catalyst composition, i.e., organometal and halogen-containing component, is usually in the range of 0.01 to 10 weight percent, based on the total amount of 1,3-butadiene charged to the reactor system. The process for preparing cis-polybutadiene can be carried out at temperatures varying over a rather wide range, e.g., from −100 to 250° F. It is usually preferred to operate at a temperature in the range of −30 to 160° F. The polymerization reaction can be carried out at any suitable pressure sufficient to maintain the reaction mixture substantially in the liquid phase.

Another elastomer to which the present invention is especially applicable is a polybutadiene prepared by polymerizing 1,3-butadiene with a lithium based catalyst. Catalysts suitable for use in the polymerization include lithium metal and organolithium compounds having the formula $RLi_x$, wherein R is an aliphatic cycloaliphatic and/or aromatic radical and $x$ is an integer from 1 to 4, inclusive. In preparing this polymer, it is often preferred to use an alkyllithium compound, such as n-butyllithium, as the catalyst. Examples of other suitable organolithium compounds include isopropyllithium, phenyllithium, 4-butylphenyllithium, cyclohexyllithium, 1,4-dilithiobutane, 1,3,5-trilithiopentane, 1,3,5,8-tetralithiodecane, and the like. The process for preparing this polybutadiene is usually conducted at a temperature in the range of −100 to 250° F., utilizing a hydrocarbon diluent similar to that employed in the cis-polybutadiene polymerization process. It is usually desirable to operate at a pressure sufficient to maintain the reaction mixture in the liquid phase. A polybutadiene having a desired inherent viscosity can be readily prepared by varying the concentration of the lithium based catalyst in the polymerization mixture.

The present invention is also applicable to the treatment of homopolymers and copolymers produced by the emulsion polymerization of conjugated dienes, either alone or with other monomers. Conjugated dienes of 4 to 6 carbon atoms are usually employed although dienes of more than 6 carbon atoms can be used, as well as the various alkoxy, such as methoxy and ethoxy, and cyano derivatives. Comonomers suitable for use with the conjugated dienes include styrene, alpha-methylstyrene, acrylonitrile, and the vinylpyridines, such as 2-vinylpyridine, 2-methyl-5-vinylpyridine, 3-ethyl-5-vinylpyridine, and the like. In the preparation of the copolymers, the amount of conjugated diene used is generally in the range of 50 to 98 parts by weight per 100 parts by weight of total monomers. The emulsion polymerization process is generally conducted at temperatures in the range −40 to 140° F. Any initiator system can be used, such as the iron-pyrophosphate-hydroperoxide, either sugar-free or containing sugar; the sulfoxylate recipe; the persulfate recipe, and the like. Any suitable emulsifier such as fatty or rosin acid soaps, or the like can be used. These recipes usually include 1 to 9 parts by weight of emulsifier per 100 parts by weight of monomers. A modifier, such as an aliphatic mercaptan, is usually employed in an amount sufficient to provide a rubber of desired viscosity.

A more comprehensive understanding of the invention can be obtained by referring to the following illustrative examples, which are not intended to be unduly limitative of the invention.

EXAMPLE I

A series of runs was conducted in which a cis-polybutadiene was compounded, using additive materials of this invention in the compounding recipe. The polybutadiene, which was prepared by polymerizing 1,3-butadiene with a catalyst formed by mixing triisobutylaluminum, titanium tetrachloride and iodine, contained about 95 percent cis 1,4-addition. A control run was also carried out in which an additive material of this invention was not present. The recipe employed in the runs was as follows:

| Recipe | Parts by weight |
|---|---|
| Polybutadiene | 100 |
| High abrasion furnace black | 50 |
| Zinc oxide | 3 |
| Stearic acid | 2 |
| Philrich 5 [1] | 10 |
| Flexamine [2] * | 1 |
| Sulfur * | 1.75 |
| NOBS Special [3] * | 1.05 |
| Additive material | [4] 5 |

*Added on remill.
[1] Aromatic oil.
[2] A physical mixture of a complex diarylamine-ketone reaction product (65%) and N,N'-diphenyl-p-phenylenediamine (35%).
[3] N-oxydiethylene-2-benzothiazyl sulfenamide.
[4] Except as noted in Table I.

In preparing the compounded stocks, the rubber, carbon black, additive material and the chemicals except for the curatives (indicated in the recipe with an asterisk) were added to a Banbury mixer. After mixing for 7 minutes, the Banbury mixer was dumped at a temperature of 280° F. or higher. Each batch was taken from the Banbury mixer to a 6" x 12" roll mill having a roll temperature of 158° F. An attempt was made to cause the batch to band with a distance between the rolls of 100 gauge (thousandths of an inch). If the particular stock did not band, the mill setting was reduced in increments of 25 until the stock banded or until the distance between the rolls was 25 gauge. In rating the ability of a stock to band, more value is placed on a stock that bands at the higher gauges.

After cooling, each stock was returned to the Banbury mixer for a 1.5 minute mix during which the curatives were added. The dump temperature was 225° F. Each stock was then placed on a 6" x 12" roll mill having a roll temperature of 125° F. The same procedure was then followed as described above in attempting to cause each stock to band.

The final remill was carried out on a cold roll mill with a gauge setting of 100. No attempt was made to reduce this gauge setting.

The milling observations and other properties of the compound stocks are shown below in Table I.

TABLE I

| Additive Material | Maximum (1) Gauge, 158° F. Mill | Mill (2) Rating | Scorch (3) Time, min. | Extrusion (4) Rating |
|---|---|---|---|---|
| Aluminum Napthenate | 75 | 7 | 18.8 | 9 |
| Zinc Napthenate | 75 | 7 | 18.1 | 6 |
| Iron Resinate (5) | 75 | 6 | 20.5 | 12− |
| Iron Tallate | 75 | 5 | 18.4 | 11 |
| None | 25 | 4 | 15.3 | 7+ |

[1] The maximum guage obtainable during the milling on the 158° F. rolls represents the maximum thickness (in thousandths of an inch) at which banding can be obtained. This property is a critical one in large-scale processing, a higher gauge being most desirable. It will be observed that use of the additives increased the gauge by 200 percent.
[2] The mill rating is the sum of three rating figures of 0 to 4 (high figures best) for the observed performance on the 158° F. mill, the 125° F. mill, and 0 to 2 on the cold mill. A perfect-milling material would thus have a rating of 10. It will be observed that use of the additives increased the mill rating by 25 to 75 percent.
[3] The scorch time is determined by ASTM Method D-1646-61 using a Mooney viscometer with a large rotor. It is the time in minutes at 280° F. required for 5-point rise above the minimum Mooney viscosity. It will be observed that use of the additives increased scorch time by 18 to 34 percent. Scorch time is determined on the compounded stocks after the final remill.
[4] Extrusion rating is determined with a No. ½ Royle Extruder using a Garvey die according to the method described in Ind. Eng. Chem. 34, 1309 (1942). The rating is based on 12 for a perfectly-formed extruded product, with lower numbers indicating less-nearly perfect products. Extrusion rating is determined on the compounded stocks after milling in the curatives.
[5] 3.7 phr. of additive material used in this run instead of 5 phr.

The data in the foregoing table show that the presence of the additive materials of this invention improved the processing characteristics of the compounded stocks. The presence of the materials in the recipe resulted in a material increase in the scorch time.

EXAMPLE II

A series of runs was carried out in which a rubbery copolymer of 1,3-butadiene and styrene (SBR) was compounded with various additive materials of the present invention. The following recipe was used in these runs:

| Recipe | Parts by weight |
|---|---|
| SBR [1] | 100 |
| Carbon black | 50 |
| Zinc oxide | 3 |
| Stearic acid | 1 |
| Philrich 5 [2] | 10 |
| Flexamine [2] * | 1 |
| Sulfur * | 1.75 |
| Santocure [3] | 1.2 |
| Additive material | [4] 5 |

*Added on remill.
[1] A butadiene-styrene copolymer containing 23.5 percent styrene and 76.5 percent butadiene and prepared by emulsion polymerization at about 41° F., using a rosin acid soap, and coagulating with salt-acid.
[2] See appropriate footnote to Recipe of Example I.
[3] N-cyclohexyl-2-benzothiazole sulfenamide.
[4] Except control run.

The procedure followed in the runs was essentially the same as that described in Example I. The results obtained are shown below in Table II.

TABLE II

| Additive Material | Scorch Time, min.[1] | Extrusion Rate, in./min.[1] |
|---|---|---|
| Iron Resinate | 19.5 | 44.0 |
| Zinc Napthenate | 22.0 | 44.2 |
| Iron Tallate | 20.3 | 44.2 |
| None | 18.2 | 41.2 |

[1] See appropriate footnotes to Table II.

The data in the foregoing table show that an improvement in scorch time and extrusion rate is obtained by utilizing the additive materials of this invention.

EXAMPLE III

Another series of runs was carried out in which natural rubber was compounded with various additive materials of the present invention. The following recipe was employed in these runs:

| Recipe | Parts by weight |
|---|---|
| Natural rubber [1] | 100 |
| Carbon black | 50 |
| Zinc oxide | 3 |
| Stearic acid | 3 |
| Philrich 5 [2] | 5 |
| Flexamine [2] * | 1 |
| Flexzone 3C [3] * | 2 |
| Vultrol [4] * | 1 |
| Sulfur * | 2.25 |
| NOBS special [2] * | 0.5 |
| Additive material | [5] 5 |

*Added on remill.
[1] #1 smoked sheets.
[2] See appropriate footnote to Recipe of Example I.
[3] N-isoprpyl-N'-phenyl-p-phenylendiamine.
[4] N-nitrosodiphenylamine.
[5] Except control run.

The compounding procedure used was essentially the same as that described in Example I. The scorch times for the stocks are shown below in Table III.

TABLE III

| Additive Material | Scorch Time, min.[1] | |
|---|---|---|
| | 250° F. | 280° F. |
| Iron Resinate | 43.6 | 15.2 |
| Zinc Napthenate | 30.7 | 11.3 |
| Iron Tallate | 34.8 | 12.8 |
| None | 28.5 | 8.5 |

[1] See appropriate footnote to Table I.

The data in Table III show that a substantial increase in scorch time was obtained by utilizing the additive materials of this invention in compounding natural rubber.

As will be evident to those skilled in the art, many variations and modifications of the invention can be practiced in view of the foregoing disclosure. Such variations and modifications are believed to come within the spirit and scope of the invention.

I claim:

1. A method of improving the milling characteristics and increasing the scorch time of a polybutadiene containing at least 85 percent of cis-1,4 addition which comprises compounding 100 parts by weight of said polybutadiene with 0.5 to 10 weight parts of a compound which functions as a processing aid and a scorch retarder selected from aluminum naphthenate and iron resinate, and thereafter milling the thus compounded stock.

2. A method according to claim 1 wherein said compound is incorporated into said polybutadiene along with a standard sulfur-type compounding recipe.

3. A rubbery composition which in its uncured state exhibits improved mill handling characteristics and increased scorch time comprising 100 parts by weight of cis-polybutadiene having at least 85 percent cis-1,4 addition and 0.5 to 10 weight parts of a compound which functions as a processing aid and scorch retarder selected from aluminum naphthenate and iron resinate.

4. A rubber composition which in its uncured state exhibits improved mill handling characteristics and increased scorch time comprising 100 parts by weight of cis-polybutadiene having at least 85 percent cis-1,4 addition 25 to 150 weight parts carbon black, 1 to 100 weight parts plasticizer, 0.5 to 5 weight parts sulfur vulcanization agent, 0.5 to 3 weight parts vulcanization accelerator, 0.5 to 20 weight parts accelerator activator, 0.5 to 3 weight parts antioxidant, and 0.5 to 10 weight parts of a compound which functions as a processing aid and a scorch retarder selected from aluminum naphthenate and iron resinate.

References Cited by the Examiner

UNITED STATES PATENTS

| 2,153,141 | 4/1939 | Engel | 260—761 |
| 2,360,895 | 10/1944 | Sarbach | 260—31.4 |
| 2,523,926 | 6/1950 | Sperberg et al. | 260—759 |
| 2,721,185 | 10/1955 | Schulze et al. | 260—27 |
| 2,854,423 | 9/1958 | Swart et al. | 260—755 |
| 2,868,745 | 1/1959 | Canarios | 260—45.75 |
| 3,004,018 | 10/1961 | Naylor | 260—94.3 |
| 3,157,609 | 11/1964 | McNay et al. | 260—27 |
| 3,245,929 | 4/1966 | Railsback et al. | 260—23.7 |

OTHER REFERENCES

Horne et al.: Industrial and Engineering Chemistry, vol. 48, April 1956, pp. 787, 788 and 791.

"Compounding Ingredients for Rubber" (1947), pp. 208, 209, 278, 279, 397 and 408.

Ludwig et al.: India Rubber World, vol. 111 October 1944, p. 57.

LEON J. BERCOVITZ, *Primary Examiner.*

R. WHITE, *Assistant Examiner.*